US009751167B1

(12) United States Patent
Note

(10) Patent No.: US 9,751,167 B1

(45) Date of Patent: Sep. 5, 2017

(54) INJECTOR CUP PRESSING TOOLS

(71) Applicant: Clayton Note, Eagle Point, OR (US)

(72) Inventor: Clayton Note, Eagle Point, OR (US)

( * ) Notice: Subject to any disclaimer, the term of this patent is extended or adjusted under 35 U.S.C. 154(b) by 464 days.

(21) Appl. No.: 14/512,610

(22) Filed: Oct. 13, 2014

Related U.S. Application Data

(60) Provisional application No. 61/897,079, filed on Oct. 29, 2013.

(51) Int. Cl.
*B23P 19/04* (2006.01)
*F02F 1/42* (2006.01)

(52) U.S. Cl.
CPC ................ *B23P 19/04* (2013.01); *F02F 1/42* (2013.01)

(58) Field of Classification Search
CPC ... B23P 1/00; B23P 3/00; B23Q 19/00; B23Q 21/00
See application file for complete search history.

(56) References Cited

U.S. PATENT DOCUMENTS 3,274,674 A 9/1966 Hooper
3,739,452 A 6/1973 Gadberry
4,059,883 A * 11/1977 Osborne ............... B25B 27/023 279/42
4,293,992 A 10/1981 Webb
4,665,602 A 5/1987 Woodward et al.
5,020,203 A 6/1991 Rix
6,363,596 B1 4/2002 Reiter et al.
6,629,349 B2 10/2003 King
6,886,227 B1 * 5/2005 Hedrick .................. B25B 27/02 29/252
6,886,228 B1 * 5/2005 Chen ..................... B25B 27/062 29/255
7,740,005 B2 6/2010 Hines
8,371,010 B2 2/2013 Jill
8,918,973 B2 * 12/2014 Kang .................... B25B 27/062 29/263
8,925,167 B1 * 1/2015 Miller ................... B25B 27/023 254/20
2009/0188470 A1 7/2009 Rettig

* cited by examiner

*Primary Examiner* — Lee D Wilson
(74) *Attorney, Agent, or Firm* — Jerry Haynes Law

(57) ABSTRACT

Injector cup pressing tools for installing and removing an injector cup from a cylinder head include a drive member configured to rotatably manipulate the tool, the drive member comprising a drive member head configured to enable rotation of the drive member; a cup support mandrel disposed to position on a distal end of the tool, the cup support mandrel comprising an internally threaded bearing end configured to form a seat for receiving a bearing, the bearing configured to translate the rotational movement applied to the drive member into a pressing motion on the cup support mandrel, the cup support mandrel further comprising a gasket end, the gasket end comprising a gasket for gripping and retaining the injector cup; and a bridge configured to help segregate the tool from the cylinder head, the bridge comprising a pair of bridge supports for adjustably regulating the elevation of the tool.

19 Claims, 5 Drawing Sheets

INJECTOR CUP PRESSING TOOLS

CROSS-REFERENCE TO RELATED APPLICATIONS

This application claims the benefits of U.S. provisional application No. 61/897,079, filed Oct. 29, 2013 and entitled INJECTOR CUP PRESSING TOOL, which provisional application is incorporated by reference herein in its entirety.

FIELD OF THE INVENTION

Illustrative embodiments of the disclosure relate generally to tools for installing and removing injector cups. More particularly, the present invention relates to a tool for enabling installation and removal of an injector cup to a cylinder head of a diesel engine by converting a rotational motion to a gentle pressing motion on the injector cup, while enabling the cylinder head to remain mounted to the engine block.

BACKGROUND OF THE INVENTION

Diesel engines use the heat of compression to initiate ignition and burn the fuel that has been injected into the combustion chamber. In the diesel engine, a cylinder head rests above the cylinders on top of the cylinder block. The cylinder head closes in the top of the cylinder, forming the combustion chamber. The joint between the cylinder head and the block is sealed by a head gasket. In most engines, the cylinder head also provides space for the passages that feed air and fuel to the cylinder, and that allow the exhaust to escape.

An injector cup is press fit into the cylinder head to separate the engine coolant from the fuel injector. Aside from just being press fit into the cylinder head, a hydraulic sealant compound may be used for a better seal than just the pressing force to keep the coolant out of the injector bore. The injector cup is, however, susceptible to damage during installation and removal. Indications of a defective injector cup may include diesel fuel in the radiator, as the seal formed by the injector cup fails, or cracks forms in the injector cup. Thus, conventional methods of manipulating an injector cup in the cylinder head may be insufficient for the task.

Accordingly, injector cup pressing tools which are suitable for installing and removing injector cups from cylinder heads with minimal excessive or stressful rotational forces may be desirable for some applications.

SUMMARY OF THE INVENTION

Illustrative embodiments of the disclosure are generally directed to injector cup pressing tools for installing and removing injector cups from cylinder heads. An illustrative embodiment of injector cup pressing tools includes a drive member disposed to extend from a proximal end of the tool, the drive member configured to rotate for manipulating the injector cup, the drive member comprising a drive member head, the drive member head being configured to enable rotation of the drive member; a cup support mandrel disposed to position on a distal end of the tool, the cup support mandrel comprising an internally threaded bearing end, the bearing end configured to form a seat for receiving a bearing, the bearing being configured to translate the rotational movement applied to the drive member into a pressing motion on the cup support mandrel, the cup support mandrel further comprising a gasket end, the gasket end comprising a gasket for gripping and retaining the injector cup during operation; and a bridge configured to help segregate the tool from the cylinder head, the bridge comprising a drive member aperture for enabling at least partial passage of the drive member, the bridge comprising a pair of bridge supports for adjustably regulating the elevation of the tool above the cylinder head.

An additional illustrative embodiment of injector cup pressing tool includes a tool for manipulating an injector cup in relation to a cylinder head, the tool having a drive member disposed to extend from a proximal end of the tool, the drive member configured to rotatably manipulate the tool, the drive member comprising a drive member head configured to provide a surface for rotating the drive member; a cup support mandrel disposed to position on a distal end of the tool, the cup support mandrel comprising a bearing end, the bearing end configured to form a seat for receiving a bearing, the bearing configured to translate the rotational movement of the drive member into a pressing motion on the cup support mandrel, the cup support mandrel further comprising a gasket end, the gasket end comprising a gasket; a bearing sleeve disposed on the bearing end, the bearing sleeve configured to at least partially encapsulate the bearing for stabilizing the bearing; a nut and at least one washer configured to help adjust position and distance between the drive member and the cup support mandrel; and a bridge disposed approximately between the drive member and the cup support mandrel, the bridge configured to elevate the tool, the bridge comprising a pair of bridge supports for adjustably regulating the elevation of the tool above the cylinder head, the pair of bridge supports comprising a pair of bolts, the bridge further comprising a plurality of threaded apertures disposed to pass through a cross sectional region of the bridge, the plurality of threaded apertures configured to enable at least partial passage of the pair of bridge supports, the bridge further comprising a drive member aperture disposed to pass through a cross sectional region of the bridge, the drive member aperture configured to enable at least partial passage of the drive member.

An additional illustrative embodiment of the invention includes a method for manipulating an injector cup in relation to a cylinder head with a tool. The method includes providing an injector cup pressing tool for controllable pressing of an injector cup into a cylinder head; retaining, within a gasket, the injector cup in a cup support mandrel; centering the injector cup over the cylinder head; restricting contact between a drive member and the cylinder head with a bridge; manipulating a pair of bridge supports for adjusting the elevation of the tool relative to the cylinder head; rotating the drive member in a direction conducive to installing or removing the injector cup; and translating, through a bearing, the rotational movement of the drive member into a pressing force on the cup support mandrel.

BRIEF DESCRIPTION OF THE DRAWINGS

Illustrative embodiments of the disclosure will now be described, by way of example, with reference to the accompanying drawings, in which:

FIG. 4A shows the drive member without a nut and washer, extending to separate the bridge from the injector cup, and FIG. 4B shows the nut and washer configured to maintain proximity between the drive member and the bridge, according to an illustrative embodiment of the injector cup pressing tool.

Like reference numerals refer to like parts throughout the various views of the drawings.

DETAILED DESCRIPTION OF THE INVENTION

Figure 1:
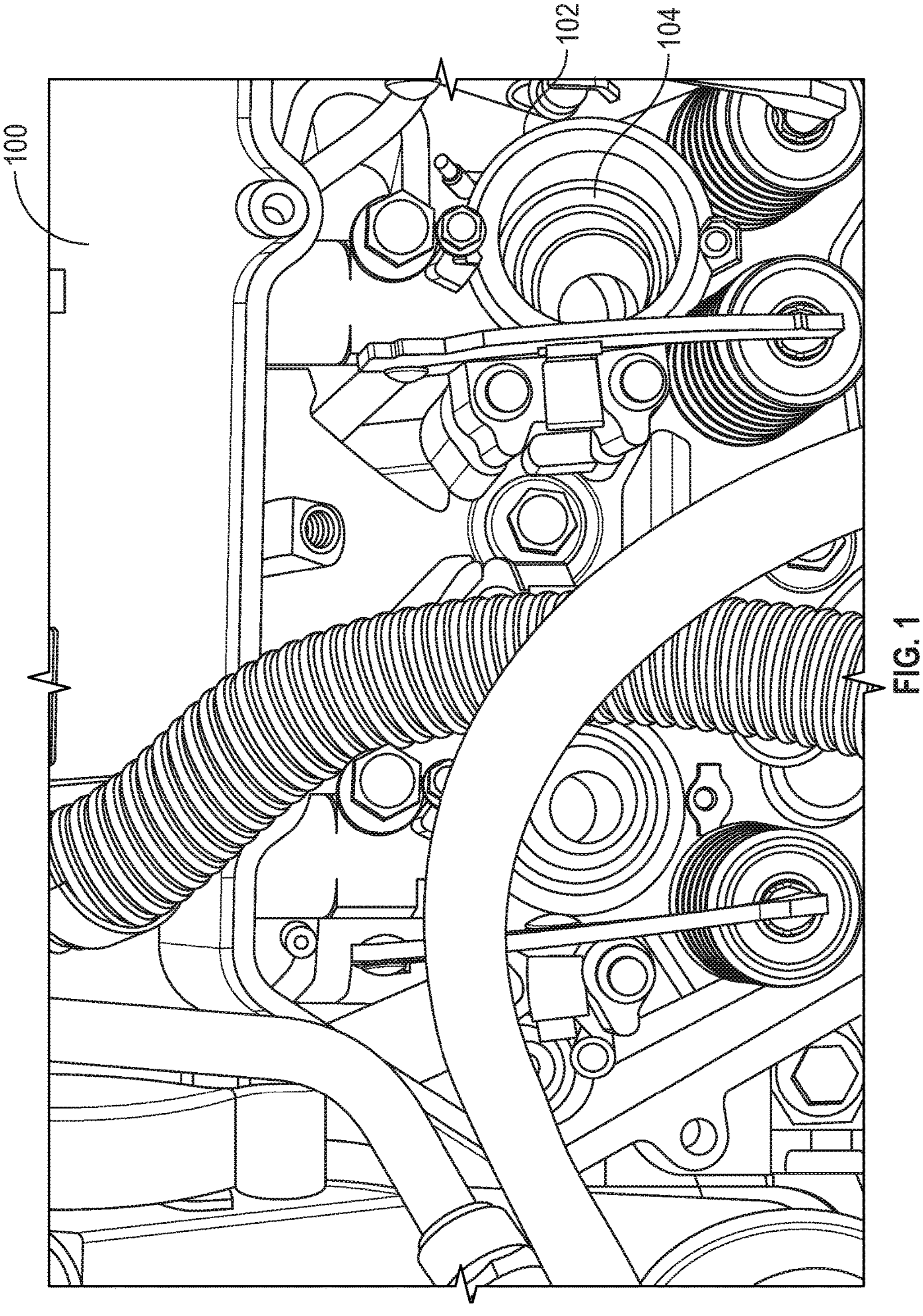
FIG. 1 is a detailed perspective view of an illustrative embodiment of an exemplary injector cup positioned inside a typical cylinder head, according to an illustrative embodiment of the injector cup pressing tool.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1-5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

The present invention discloses an injector cup pressing tool 200 for installing and removing an injector cup from a cylinder head. The tool 200 is described in FIGS. 1 through 4B. In one embodiment of the present invention, the tool 200 functions to enable relatively gentle installation and removal of an injector cup 104 to a cylinder head 102 of a diesel engine 100 by pressing the injector cup 104 into an injector bore (not shown). The tool 200 also enables the cylinder head 102 to remain mounted to the engine 100 during operation by positioning a bridge 218 between the tool 200 and the engine 100.

In some embodiments, a drive member 202 provides a rotatable mechanism for manipulating the tool 200 and the injector cup 104. A bearing 210 serves to translate the rotatable motion of the drive member 202 into a generally linear pressing motion on the opposite end of the tool 200 for a more gentle pressing installation and removal of the injector cup 104. In this manner, the injector cup 104 may be installed and removed from the cylinder head 102 through a relatively less forceful pressing motion than a potentially more stressful rotating or twisting motion. In some embodiments, the tool 200 gently presses the injector cup 104 into the cylinder head 102, or enables the application of a substantial pulling force in order to effectively extract the injector cup 104 rapidly and without undue effort. Additionally, a bridge 218 creates adjustable spacing from the engine 100, such that the cylinder head 102 can remain mounted to an engine block during operation of the tool 200.

Those skilled in the art, in light of the present teachings, will recognize that the injector cup 104 may include a brass cup, which is press fit into the cylinder head 102 (FIG. 1). The injector cup 104 separates the engine coolant from the fuel injector. Aside from just being press fit into the cylinder head 102, a hydraulic sealant compound may be used for a better seal than just the press to keep the coolant out of the injector bore. Indications of a defected injector cup 104 needing replacement may include diesel fuel in the radiator, as the seal formed by the injector cup 104 fails, or cracks forms in the injector cup 104. The tool 200 may be efficacious for servicing the injector cups 104 in 94-03 7.3 L and T444E engines 100. In other embodiments, the tool 200 may, however, be utilized with other types of diesel engines 100.

In some embodiments, the injector cup 104 may be installed and removed from the cylinder head 102 through a relatively less forceful pressing motion than a potentially more stressful rotating or twisting motion. In this manner, the tool 200 allows for greater control and precision while pressing the injector cup 104 into place, as opposed to forcibly fitting the injector cup 104 into the cylinder head 102, which may cause damage to the cylinder head 102 and the inner injector bore cavity. Additionally, the tool 200 enables the cylinder head 102 to remain mounted to the engine 100 during installation and removal of the injector cup 104, chiefly because the tool 200 remains supported by a bridge 218. The bridge 218 creates sufficient space between the tool 200 and the engine 100 such that the tool 200 may position between rocker arms, thereby avoiding engagement with the tool 200 and the engine 100 during operation. This separation between the tool 200 and the components of the engine 100 create a safer environment for the injector cup 104, and also provide more space for the user to operate the tool 200. Suitable materials for the tool 200 may include, without limitation, aluminum, brass, steel, and metal alloys.

Figure 2:
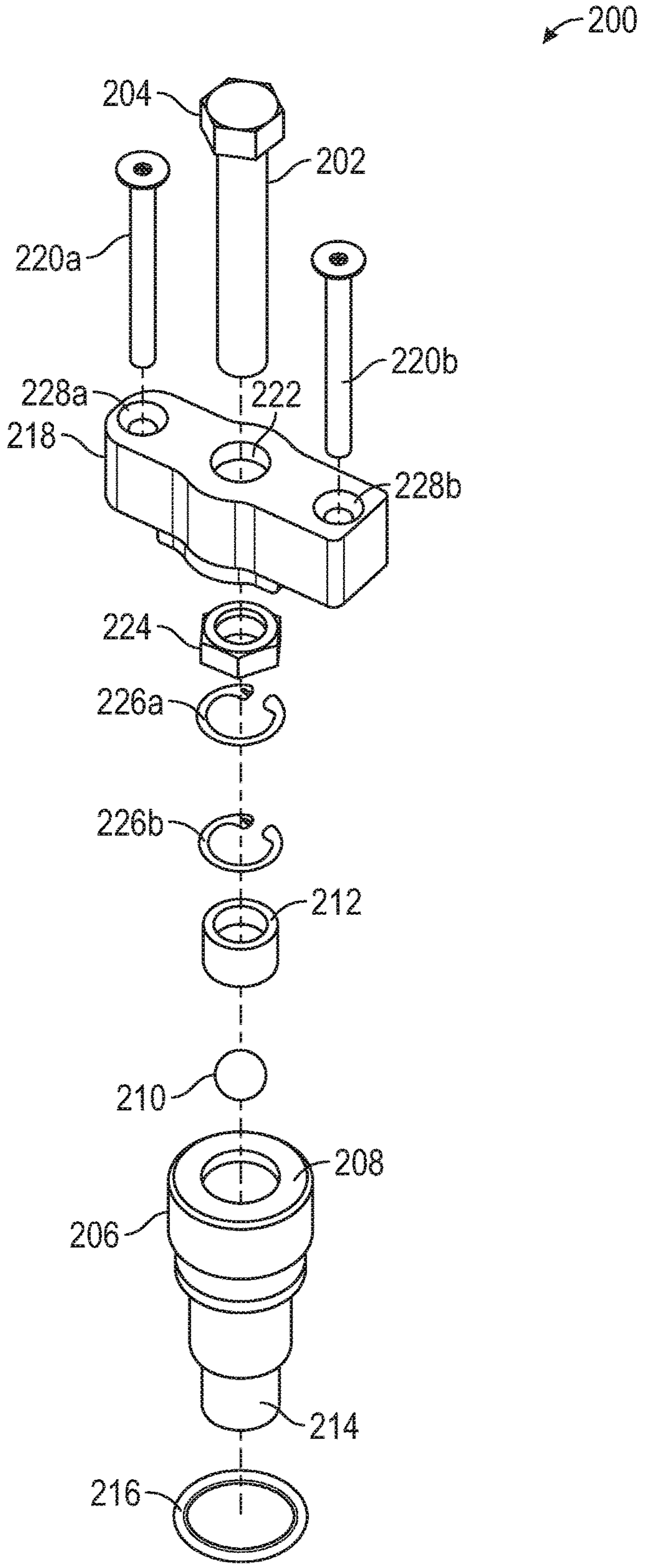
FIG. 2 is an exploded view of an exemplary injector cup pressing tool, according to an illustrative embodiment of the injector cup pressing tool.

Turning now to FIG. 2, the tool 200 comprises a drive member 202, such as a hardened bolt, that extends from a proximal end of the tool 200. The drive member 202 enables manipulation, installation, and removal of the tool 200 and/or the injector cup 104. A drive member head 204 on the drive member 202 may be engaged by a wrench or hand to operate the tool 200 and manipulate the injector cup 104 into the cylinder head 102, accordingly. The drive member head 204 may have a hexagonal shape to mate with a wrench and provide a surface for hand tightening. The drive member 202 is configured to rotate in either direction for installing or removing the injector cup 104. The drive member 202 may include, without limitation, a hardened bolt having a threaded lower section, a rod, a shaft, and a screw. In other embodiments, any rod that can rotatably manipulate the tool 200 may, however, be used.

A cup support mandrel 206 positions on a distal end of the tool 200. The cup support mandrel 206 consists of a cylinder having a tubular shape. One end of the cup support mandrel 206 may have a larger diameter than the opposite end. The cup support mandrel 206 is shaped and dimensioned to grip a cup shaped object, such as the injector cup 104. The cup support mandrel 206 is sized to be pressed into the cylinder head 102. In this manner, the cup support mandrel 206 is efficacious for sealing a cavity of the injector bore by pressing the injector cup 104 into the cylinder head 102, which also maintains a clean environment within the cavity of the injector bore by keeping external debris outside.

The cup support mandrel 206 comprises an internally threaded bearing end 208. The bearing end 208 forms a seat for enabling a bearing 210, such as a ball bearing 210 to position and operate. In other embodiments, the bearing 210 may include, however, without limitation, a plain bearing, a rolling element bearing, a jewel bearing, a fluid bearing, a magnetic bearing, and a flexure bearing. The bearing 210 is operable to translate the rotational movement applied onto the drive member 202 into a pressing motion on the cup support mandrel 206. In essence, the bearing 210 enables the drive member 202 to rotate without necessitating the rotation of the injector cup 104. In this manner, the positioning and orientation of the tool 200 may be manipulated without affecting the installation or removal of the injector cup 104.

Figure 3:
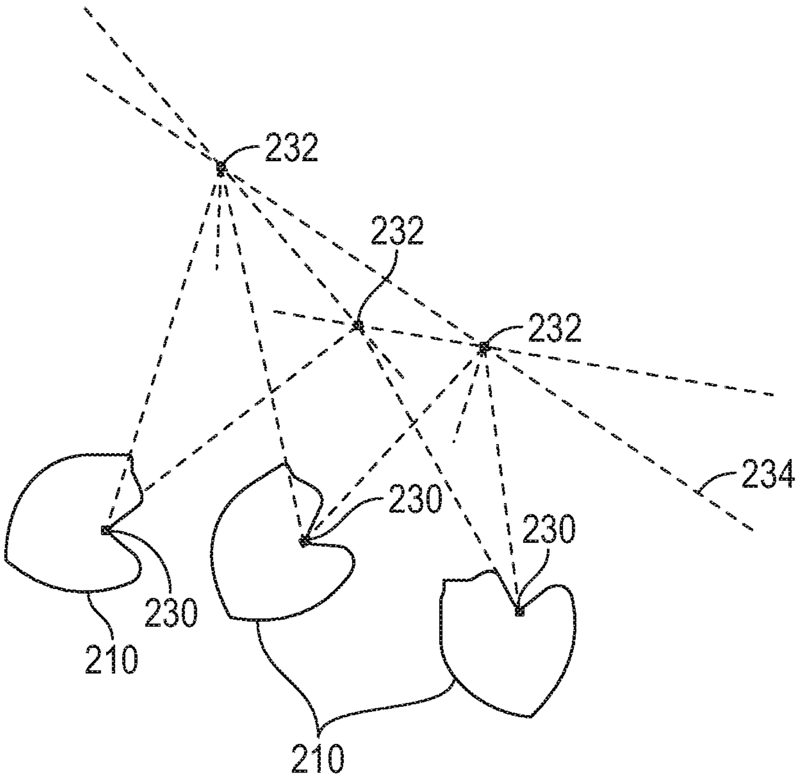
FIG. 3 is a diagram of an exemplary sphere rotating around a static rotation point for conversion into a linear motion, according to an illustrative embodiment of the injector cup pressing tool.

Those skilled in the art, in light of the present teachings, will recognize that the bearing 210 utilizes fundamental laws of rotation to convert the rotational force generated by the drive member 202 into a generally linear pressing action on the cup support mandrel 206 (FIG. 3). Generally, a rotation is a motion of a certain space that preserves a rotation point 230 on the space, which in this case is a spherical bearing 210. The rotation point 230 forms the fulcrum/axis on which the rotation occurs. The rotation point 230 on the bearing 210 remains static while the rest of the bearing 210 rotates. As the bearing 210 continues rotating due to the rotational force exerted by the drive member 202, a conversion point 232 is formed. The conversion point 232 is the point where the rotational motion converts to a linear motion 234. This is constantly changing also. Euclidean geometry teaches that a plane rotation around a first conversion point followed by another rotation around a second conversion point results in the linear motion 234. It is this linear motion 234 that forms the gentle pressing action on the cup support mandrel 206.

In some embodiments, the bearing 210 may rotate inside a bearing sleeve 212 for enhanced positioning and control of the bearing 210. The bearing sleeve 212 restricts the bearing 210 to a specified section of the bearing end 208. In this manner, the bearing 210 helps constrain relative motion between the drive member 202 and the cup support mandrel 206 to only the desired rotational motion. The bearing sleeve 212 may have an annular shape that at least partially encapsulates the bearing 210.

The cup support mandrel 206 further comprises a gasket end 214 for supporting a gasket 216, such as an o-ring. The gasket 216 serves to grip and retain the injector cup 104 during operation. The gasket 216 may include, without limitation, an o-ring, a toric joint, a ring joint gasket, and any elastomeric member that is sized and dimensioned to retain variously sized injector cups 104 and provide at least a partial seal. In some embodiments, the gasket 216 may comprise an internal diameter greater than the injector cup 104 and an external diameter less than the diameter of the gasket end 214 on which the gasket 216 secures. In one embodiment, the gasket 216 may include a loop of elastomer with a round cross-section, designed to be seated in a groove that forms on the gasket end 214 and compressed between the injector cup 104 and the gasket end 214; thus creating a seal at their interface.

Figure 4A:
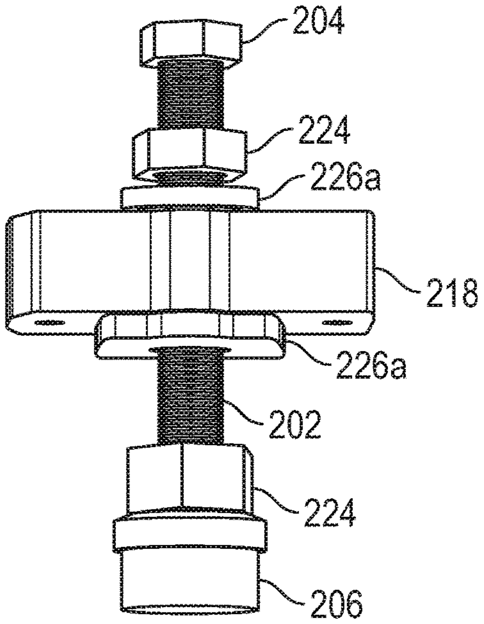
FIGS. 4A and 4B are perspective views of an exemplary injector cup pressing tool in multiple positions, where

Turning now to FIG. 4A, the tool 200 may include a bridge 218 to help support the tool 200 on the engine 100 and for minimizing damage to the rocker arm, cylinder head, or injector bore during installation and removal. The bridge 218 creates space above the engine 100 so that manipulation, removal, and installation of the injector cup 104 and the tool 200 do not damage the cylinder head 102 or rocker arm. In this manner, the bridge 218 creates adjustable spacing from the engine 100, such that the cylinder head 102 can remain mounted to an engine block during operation of the tool 200. The bridge 218 may include a generally rectangular shaped block. The bridge 218 comprises a drive member aperture 222 configured to enable passage of the drive member 202. The bridge 218 further comprises a plurality of threaded apertures 228*a*, 228*b* on either side of the drive member aperture 222, passing through a cross section of the bridge 218.

In some embodiments, the bridge 218 utilizes a nut 224 and at least one washer 226*a*, 226*b* to help adjust the position and distance between the drive member 202 and the cup support mandrel 206. To achieve adjustability, the nut 224 rotatably moves along a longitudinal axis of the drive member 202 and locks into a desired position against the at least one washer 226*a*, 226*b*. Consequently, the drive member 202 locks into position relative to the cup support mandrel 206 until further adjustments are needed. For example, without limitation, during initial installation, the drive member 202 is rotatably screwed through the nut 224, the at least one washer 226*a*, 226*b*, and the threaded inner section of the bearing end 208 to create a proximal disposition between the drive member 202 and the cup support mandrel 206. As the injector cup 104 is removed, the drive member 202 may be rotatably distanced from the cup support mandrel 206. In this manner, the distance from the cylinder head 102 is regulated to protect the engine 100, the cylinder head 102, and the rocker arm from damage.

Figure 4B:
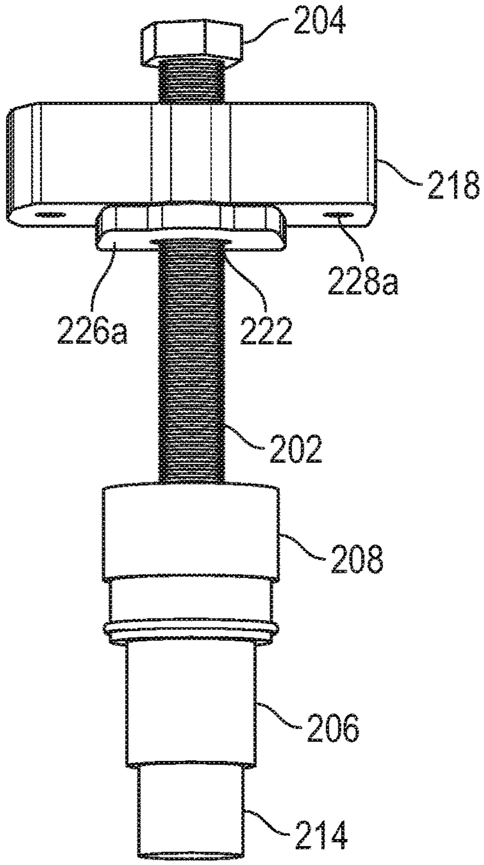

As referenced in FIG. 4B, a pair of bridge supports 220*a*, 220*b* position on each end of the bridge 218 to adjustably position the desired height of the tool 200 over the engine 100. The pair of bridge supports 220*a*, 220*b* may include a pair of bolts that pass through the threaded apertures 228*a*, 228*b* in the bridge 218. The pair of bridge supports 220*a*, 220*b* may be adjusted to position the bridge 218 to a desired height over the engine 100. The positioning may be performed by rotating a pair of screws through the threaded apertures 228*a*, 228*b* in the bridge 218. The pair of bridge supports 220*a*, 220*b* may include, without limitation, bolts, screws, anchors, and blocks.

In one aspect of the present invention, the tool 200 comprises: a drive member 202, the drive member 202 being disposed to extend from a proximal end of the tool 200, the drive member 202 being configured to rotate for manipulating the injector cup 104, the drive member 202 comprising a drive member head 204, the drive member head 204 being configured to enable rotation of the drive member 202; a cup support mandrel 206, the cup support mandrel 206 being disposed to position on a distal end of the tool 200, the cup support mandrel 206 comprising an internally threaded bearing end 208, the bearing end 208 being configured to form a seat for receiving a bearing 210, the bearing 210 being configured to translate the rotational movement applied to the drive member 202 into a pressing motion on the cup support mandrel 206, the cup support mandrel 206 further comprising a gasket end 214, the gasket end 214 comprising a gasket 216 for gripping and retaining the injector cup 104 during operation; and a bridge 218, the bridge 218 being configured to help segregate the tool 200 from the cylinder head 102, the bridge 218 comprising a drive member aperture 222 for enabling at least partial passage of the drive member 202, the bridge 218 comprising a pair of bridge supports 220*a*, 220*b* for adjustably regulating the elevation of the tool 200 above the cylinder head 102.

Figure 5:
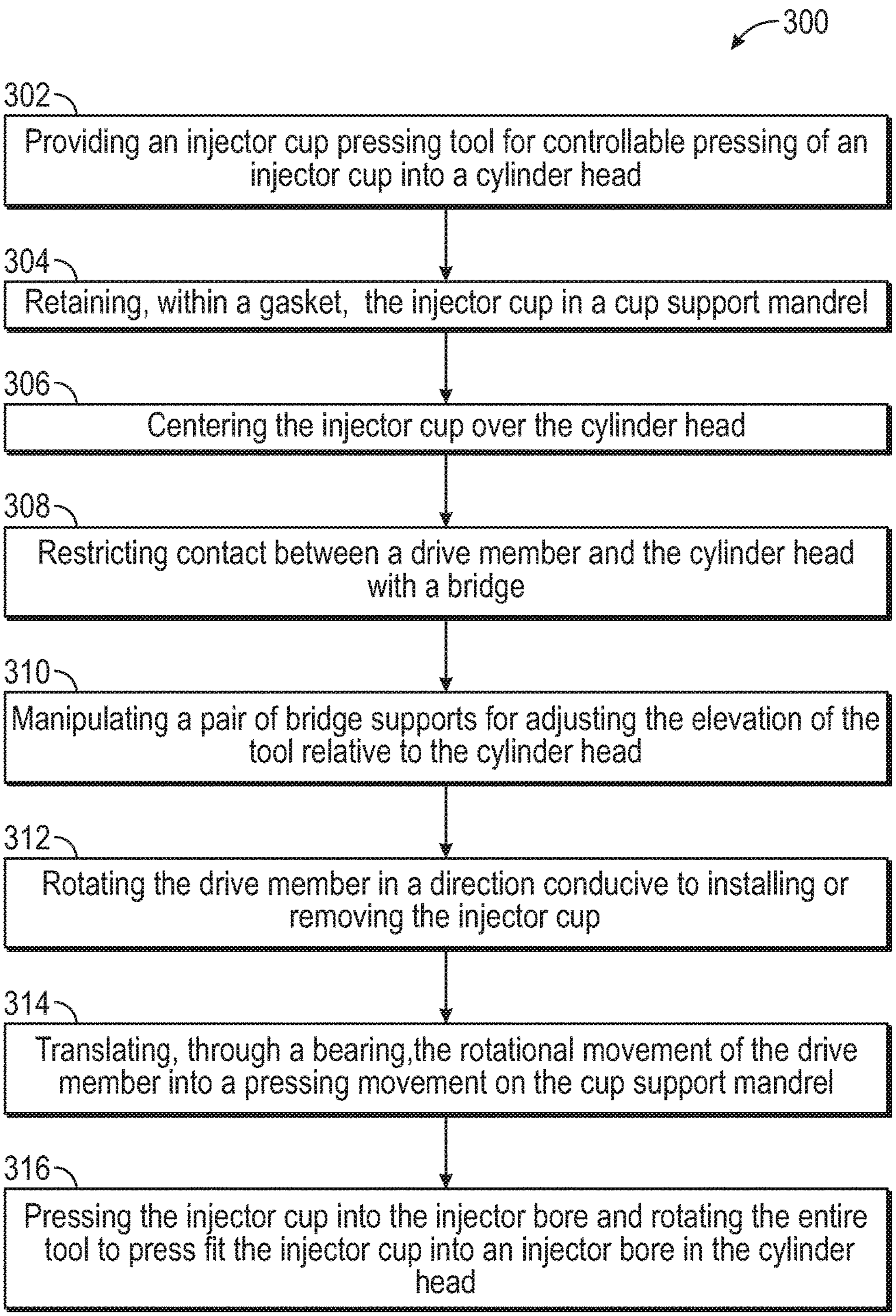
FIG. 5 is a flowchart diagram of an exemplary method for installing and removing an injector cup with an injector cup pressing tool, according to an illustrative embodiment of the injector cup pressing tool.

In operation, a method 300 for installing and removing an injector cup 104 with an injector cup pressing tool 200 is referenced in FIG. 5. Ideally, the tool 200 is operable to follow a series of steps for enabling nonintrusive, relatively gentle installation and removal of an injector cup 104 to a cylinder head 102 of a diesel engine 100 by pressing the injector cup 104 into the injector bore. The method 300 allows the cylinder head 102 to remain mounted to the engine 100 during installation. The method 300 comprises a first Step 302 of providing an injector cup pressing tool 200 for controllable pressing of an injector cup 104 into a cylinder head 102. The tool 200 comprises a substantially longitudinal member having a proximal end for manipulating the drive member 202, such that operation of the tool 200 is possible. A distal end of the tool 200 includes a cup support mandrel 206 for engaging the injector cup 104. A generally centrally located bearing 210 translates the rotational movement of the drive member 202 into a pressing motion at the cup support mandrel 206.

The method 300 may also comprises a Step 304 of retaining, within a gasket 216, the injector cup 104 in a cup support mandrel 206. The gasket 216 may include a toric joint, such as an o-ring, that grips and retains the injector cup 104. The gasket 216 is disposed at a gasket end 214 of the cup support mandrel 206. A Step 306 includes centering the injector cup 104 over the cylinder head 102. In this manner, the injector cup 104 sits flush inside the injector bore.

A next Step 308 involves restricting contact between a drive member 202 and the cylinder head 102 with a bridge 218. Step 308 involves engaging the engine 100 with the bridge 218 and a pair of bridge supports 220*a*, 220*b* to restrict contact between the moving components of the tool 200 with the cylinder head 102. The bridge 218 helps support the tool 200 on the engine 100, and minimizes damage to the rocker arm, cylinder head 102, or cylinder cup during installation and removal. The bridge 218 also creates space above the engine 100 such that manipulation, removal, and installation of the injector cup 104 and the tool 200 do not damage the cylinder head 102 or rocker arms.

At this point, Step 310 comprises manipulating a pair of bridge supports 220*a*, 220*b* for adjusting the elevation of the tool 200 relative to the cylinder head 102. The pair of bridge supports 220*a*, 220*b* position on each end of the bridge 218 to adjustably position the desired height of the tool 200 over the engine 100. Step 312 may include rotating the drive member 202 in a direction conducive to installing or removing the injector cup 104. This may be accomplished by rotating the drive member 202 to engage an inner threaded surface of a bearing end 208 of the cup support mandrel 206. In one embodiment, rotating the drive member 202 in a clockwise direction enables the cup support mandrel 206 to press against the bridge 218. The distance between each may be adjusted for removal and/or installation of the injector cup 104. A drive member head 204, such as a head on a bolt may be engaged by a wrench or hand to operate the tool 200 and manipulate the injector cup 104 into the cylinder head 102, accordingly.

A next Step 314 comprises translating, through a bearing 210, the rotational movement of the drive member 202 into a pressing movement of the cup support mandrel 206. The bearing 210 helps constrain relative motion between the drive member 202 and the cup support mandrel 206 to only the desired motion. In some embodiments, the bearing 210 may rotate inside a bearing sleeve 212 for enhanced positioning and control of the bearing 210. The bearing sleeve 212 restricts the bearing 210 to a specified section of the bearing end 208.

A final Step 316 comprises pressing the injector cup 104 into the injector bore and rotating the entire tool 200 to create an appropriate press fit. In some embodiments, 20 ft-lbs of force may be required to press the injector cup 104 into the injector bore. Those skilled in the art will, however, recognize that excessive pressure may damage the injector cup 104 and the cylinder head 102. Thus the rotational translation into a gentle pressing force that is enabled through the bearing 210 helps reduce damage to the cylinder head 102. In one alternative embodiment, the tool 200 includes a pressure gauge to indicate the amount of pressure being applied to the injector cup 104 during installation. In yet another alternative embodiment, the cup support mandrel 206 may comprise a magnetic composition for facilitating removal of the injector cup 104. In yet another alternative embodiment, the drive member 202 is automated, and thereby does not require manual rotation.

In one embodiment, of the present invention provides a tool 200 that converts rotational movement into a gentle pressing movement for manipulation of an injector cup 104 in and out of the cylinder head 102.

In another embodiment, the tool 200 enables the cylinder head 102 to remain on the engine 100 during installation and removal of the injector cup 104.

In yet another embodiment, the bridge 218 forms a barrier that creates space between the tool 200 and the engine 100 during operation.

One benefit of the tool 200 is that it enables the injector cup 104 to be pressed into the cylinder head 102 without forcible actions, such as tapping or pounding.

Another benefit is the pressure applied during installation and removal of the injector cup 104 is controllable.

Another benefit is that the tool 200 has an adjustable length for operating in different types of diesel engines.

Yet another benefit is that the bridge 218 creates adjustable spacing from the engine 100, such that the cylinder head 102 can remain mounted to the engine block during operation of the tool 200.

Yet another benefit is that the pair of bridge supports 220*a*, 220*b* enable adjustable elevation of the tool 200 relative to the cylinder head 102 for enhancing maneuverability during operation, and minimizing damage to the engine 100.

Another benefit is that the tool 200 is relatively simple and inexpensive to manufacture, having minimal moving parts.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A tool for manipulating an injector cup in relation to a cylinder head, the tool comprising:

- a drive member disposed to extend from a proximal end of the tool, the drive member configured to rotatably manipulate the tool;
- a cup support mandrel disposed to position on a distal end of the tool, the cup support mandrel comprising a bearing end, the bearing end configured to form a seat for receiving a ball bearing, the ball bearing configured to translate the rotational movement of the drive member into a pressing motion on the cup support mandrel, the cup support mandrel further comprising a gasket end, the gasket end comprising a gasket for grip and retention; and a bridge disposed approximately between the drive member and the cup support mandrel, the bridge configured to elevate the tool, the bridge comprising a pair of bridge supports for adjustably regulating the elevation of the tool above the cylinder head.

2. The tool of claim 1, wherein the drive member comprises a bolt.

3. The tool of claim 1, wherein the drive member is disposed in generally perpendicular relationship with the bridge.

4. The tool of claim 1, further including a drive member head disposed to join with the drive member, the drive member head configured to enable rotation of the drive member.

5. The tool of claim 1, wherein the drive member head has a generally hexagonal shape.

6. The tool of claim 1, wherein the cup support mandrel has a generally cylindrical shape.

7. The tool of claim 1, wherein the bearing end is internally threaded.

8. The tool of claim 1, further including a bearing sleeve configured to at least partially encapsulate the bearing for stabilizing positioning of the bearing.

9. The tool of claim 1, wherein the gasket comprises an O-ring.

10. The tool of claim 1, further including a nut and at least one washer configured to help adjust position and distance between the drive member and the cup support mandrel.

11. The tool of claim 10, wherein the nut is internally threaded.

12. The tool of claim 11, wherein the at least one washer comprises a pair of lock washers.

13. The tool of claim 1, wherein the bridge comprises a bottom wall, a top wall spaced-apart from the bottom wall and multiple sidewalls extending between the bottom wall and the top wall.

14. The tool of claim 1, wherein the bridge comprises a drive member aperture disposed to pass through a cross sectional region of the bridge, the drive member aperture configured to enable at least partial passage of the drive member.

15. The tool of claim 1, wherein the bridge comprises a plurality of threaded apertures disposed to pass through a cross sectional region of the bridge, the plurality of threaded apertures configured to enable at least partial passage of the pair of bridge supports.

16. A tool for manipulating an injector cup in relation to a cylinder head, the tool comprising:

a drive member disposed to extend from a proximal end of the tool, the drive member configured to rotatably manipulate the tool, the drive member comprising a drive member head configured to provide a surface for rotating the drive member;

a cup support mandrel disposed to position on a distal end of the tool, the cup support mandrel comprising a bearing end, the bearing end configured to form a seat for receiving a ball bearing, the ball bearing configured to translate the rotational movement of the drive member into a pressing motion on the cup support mandrel, the cup support mandrel further comprising a gasket end, the gasket end comprising a gasket;

a bearing sleeve disposed on the bearing end, the bearing sleeve configured to at least partially encapsulate the ball bearing for stabilizing the ball bearing;

a nut and at least one washer configured to help adjust position and distance between the drive member and the cup support mandrel; and a bridge disposed approximately between the drive member and the cup support mandrel, the bridge configured to elevate the tool, the bridge comprising a pair of bridge supports for adjustably regulating the elevation of the tool above the cylinder head, the pair of bridge supports comprising a pair of bolts, the bridge further comprising a plurality of threaded apertures disposed to pass through a cross sectional region of the bridge, the plurality of threaded apertures configured to enable at least partial passage of the pair of bridge supports, the bridge further comprising a drive member aperture disposed to pass through a cross sectional region of the bridge, the drive member aperture configured to enable at least partial passage of the drive member.

17. The tool of claim 16, wherein the drive member comprises a bolt.

18. The tool of claim 16, wherein the drive member is disposed in generally perpendicular relationship with the bridge.

19. A method for manipulating an injector cup in relation to a cylinder head with a tool, the method comprising:

providing an injector cup pressing tool for controllable pressing of an injector cup into a cylinder head;

retaining, within a gasket, the injector cup in a cup support mandrel;

centering the injector cup over the cylinder head;

restricting contact between a drive member and the cylinder head with a bridge;

manipulating a pair of bridge supports for adjusting the elevation of the tool relative to the cylinder head;

rotating the drive member in a direction conducive to installing or removing the injector cup; and translating, through a ball bearing, the rotational movement of the drive member into a pressing force on the cup support mandrel.

* * * * *